United States Patent
Hisada

(10) Patent No.: US 9,030,072 B2
(45) Date of Patent: May 12, 2015

(54) ROTOR CONFIGURED TO BE ROTATEABLY DISPOSED IN AN ELECTRIC ROTATING MACHINE WITH A CIRCUMFERENTIAL SURFACE OF A ROTOR CORE FACING A STATOR OF THE ELECTRIC ROTATING MACHINE

(75) Inventor: Tomokazu Hisada, Anjo (JP)

(73) Assignee: Denso Corporation, Kariya (JP)

( * ) Notice: Subject to any disclaimer, the term of this patent is extended or adjusted under 35 U.S.C. 154(b) by 469 days.

(21) Appl. No.: 13/475,114

(22) Filed: May 18, 2012

(65) Prior Publication Data

US 2012/0293033 A1    Nov. 22, 2012

(30) Foreign Application Priority Data

May 19, 2011  (JP) .................................. 2011-112377

(51) Int. Cl.
*H02K 1/27* (2006.01)

(52) U.S. Cl.
CPC .............. *H02K 1/2766* (2013.01); *H02K 1/276* (2013.01)

(58) Field of Classification Search
CPC ....... H02K 1/27; H02K 1/2706; H02K 1/272; H02K 1/274; H02K 1/276
USPC ........................... 310/156.43, 156.53, 156.57
See application file for complete search history.

(56) References Cited

U.S. PATENT DOCUMENTS

| | | | | |
|---|---|---|---|---|
| 7,851,958 B2 * | 12/2010 | Cai et al. | ................... | 310/156.53 |
| 8,294,320 B2 * | 10/2012 | Vyas | .......................... | 310/156.57 |
| 2009/0045689 A1 * | 2/2009 | Haruno et al. | ........... | 310/156.56 |
| 2011/0193439 A1 * | 8/2011 | Yabe et al. | ................ | 310/156.38 |

FOREIGN PATENT DOCUMENTS

| | | | |
|---|---|---|---|
| JP | 2003-143788 | 5/2003 | |
| JP | 2007-60755 | 3/2007 | |
| JP | 2008-148391 | 6/2008 | |
| WO | 2010/058609 | 5/2010 | |
| WO | WO 2010058609 A1 * | 5/2010 | ............... H02K 1/27 |

OTHER PUBLICATIONS

Partial machine translation of WO2010/058609A1 (May 2010).*
Office Action (2 pgs.) dated May 7, 2013 issued in Japanese Application No. 2011-112377 with an at least partial English-language translation thereof (2 pgs.).

* cited by examiner

*Primary Examiner* — Michael Andrews
(74) *Attorney, Agent, or Firm* — Nixon & Vanderhye PC

(57) ABSTRACT

A rotor includes a rotor core with a circumferential surface facing a stator and permanent magnets each received in a corresponding slot of the rotor core. Each of the permanent magnets has a first corner portion positioned closest to the circumferential surface of the rotor core and a first side surface that intersects an imaginary line, faces toward the stator side and makes up part of the first corner portion. The imaginary line extends in the magnetization direction of the permanent magnet through the center of the permanent magnet. Between the first side surface of the permanent magnet and the inner surface of the corresponding slot, there are formed a first gap, a second gap and an abutment area from the first corner portion side in this order. The first gap has a smaller width than the second gap in a direction perpendicular to the first side surface.

7 Claims, 7 Drawing Sheets

ROTOR CONFIGURED TO BE ROTATEABLY DISPOSED IN AN ELECTRIC ROTATING MACHINE WITH A CIRCUMFERENTIAL SURFACE OF A ROTOR CORE FACING A STATOR OF THE ELECTRIC ROTATING MACHINE

CROSS-REFERENCE TO RELATED APPLICATION

This application is based on and claims priority from Japanese Patent Application No. 2011-112377, filed on May 19, 2011, the content of which is hereby incorporated by reference in its entirety into this application.

BACKGROUND

1. Technical Field

The present invention relates to rotors for electric rotating machines that are used in, for example, motor vehicles as electric motors and electric generators. In addition, the invention can also be applied to industrial machines and household electrical appliances.

2. Description of Related Art

There are known electric rotating machines which include an Interior Permanent Magnet (IPM) rotor.

As shown in FIG. 7A, the IPM rotor 100 includes a rotor core 101 that has a plurality of slots 102 formed therein and a plurality of permanent magnets 103 each of which is inserted in a corresponding one of the slots 102 of the rotor core 101.

Each of the permanent magnets 103 has a substantially rectangular cross section perpendicular to the axial direction of the rotor core 101 (i.e., the direction perpendicular to the paper surface of FIG. 7A). Accordingly, each of the permanent magnets 103 has four corner portions including a first corner portion 103a.

Among the four corner portions of the permanent magnet 103, the first corner portion 103a is positioned closest to an outer circumferential surface (or a radially outer surface) 100a of the rotor core 101; the outer circumferential surface 100a faces a stator (not shown) of the electric rotating machine which is disposed radially outside of the rotor 100.

Moreover, among the four corner portions of the permanent magnet 103, it is easiest for a demagnetizing magnetic field to concentrate on the first corner portion 103a. Here, the demagnetizing magnetic field denotes a magnetic field which is applied by the stator to the permanent magnet 103 in a direction opposite to the magnetization direction of the permanent magnet 103. Consequently, the first corner portion 103a is most likely to be permanently demagnetized by the demagnetizing magnetic field.

To prevent the demagnetizing magnetic field from concentrating on the first corner portion 103a, there is disclosed, for example in Japanese Patent Application Publications No. 2008-148391 and No. 2003-143788, a technique of providing an air hole around the first corner portion 103a.

Specifically, according to the technique, as shown in FIG. 7A, a gap 105 is formed between a radially outer end portion (i.e., an end portion on the first corner portion 103a side) of a first side surface 103b of the permanent magnet 103 and the inner surface of the corresponding slot 102 (i.e., the inner surface of the rotor core 101 which defines the corresponding slot 102) in the magnetization direction of the permanent magnet 103. The first side surface 103b extends perpendicular to the magnetization of the permanent magnet 103 and makes up part of the first corner portion 103a of the permanent magnet 103.

With the gap 105, it becomes difficult for the demagnetizing magnetic field to concentrate on the first corner portion 103a. However, at the same time, the volume of the rotor core 101 is reduced by the gap 105. Consequently, it becomes easy for magnetic saturation to occur in the rotor core 101 in the vicinity of the gap 105.

Referring further to FIG. 7B, when an area A of the rotor core 101 in the vicinity of the first corner portion 103a of the permanent magnet 103 is magnetically saturated, it is impossible for magnetic flux from the stator to flow through the magnetically-saturated area A. Consequently, the magnetic flux from the stator comes to flow into the permanent magnet 103 via a dead end 105a of the gap 105. As a result, the demagnetizing magnetic field comes to concentrate on a given portion of the permanent magnet 103 in the vicinity of the dead end 105a of the gap 105.

That is, according to the above technique, concentration of the demagnetizing magnetic field is prevented from occurring at the first corner portion 103a of the permanent magnet 103, but instead occurs at the given portion of the permanent magnet 103 which is positioned close to the first corner portion 103a. As a result, the maximum strength of the demagnetizing magnetic field in the permanent magnet 103 is increased.

Generally, the thickness of the permanent magnet 103 in the magnetization direction is set based on the maximum strength of the demagnetizing magnetic field in the permanent magnet 103, so as to reliably prevent the permanent magnet 103 from being permanently demagnetized by the demagnetizing magnetic field.

Accordingly, with the increase in the maximum strength of the demagnetizing magnetic field in the permanent magnet 103, the thickness of the permanent magnet 103 in the magnetization direction is also increased. As a result, the volume and thus the weight of the permanent magnet 103 are accordingly increased, thereby increasing the cost of the rotor 100.

SUMMARY

According to an exemplary embodiment, a rotor for an electric rotating machine is provided. The rotor includes a rotor core and a plurality of permanent magnets. The rotor core has a plurality of slots formed therein. The rotor core also has a circumferential surface that extends in the circumferential direction of the rotor core. Each of the permanent magnets is received in a corresponding one of the slots of the rotor core. The rotor is configured to be rotatably disposed in the electric rotating machine with the circumferential surface of the rotor core facing a stator of the electric rotating machine. When viewed along the axial direction of the rotor core, each of the permanent magnets has a plurality of corner portions among which a first corner portion is positioned closest to the circumferential surface of the rotor core. Each of the permanent magnets also has a plurality of side surfaces including a first side surface that intersects an imaginary line, faces toward the stator side and makes up part of the first corner portion of the permanent magnet. The imaginary line extends in the magnetization direction of the permanent magnet through the center of the permanent magnet. For each of the permanent magnets, there are formed, between the first side surface of the permanent magnet and the inner surface of the corresponding slot of the rotor core (i.e., the inner surface of the rotor core which defines the corresponding slot), a first gap, a second gap and an abutment area from the first corner portion side in this order. The first and second gaps both separate the first side surface of the permanent magnet from the inner surface of the corresponding slot of the rotor core and communicate with each other. At the abutment area, the first side surface of the permanent magnet and the inner surface of the corresponding slot of the rotor core abut each other. The first gap has a smaller width than the second gap in a direction perpendicular to the first side surface of the permanent magnet.

With the above configuration, by setting the width of the first gap to be smaller than that of the second gap, the volume of that part of the rotor core which is positioned between the first gap and the circumferential surface of the rotor core is increased. Consequently, magnetic saturation is prevented from occurring at that part of the rotor core. As a result, the magnetically-saturated area of the rotor core in the vicinity of the first corner portion of the permanent magnet is reduced in comparison with the prior art shown in FIG. 7B.

Further, with the reduced magnetically-saturated area of the rotor core, it becomes possible for magnetic flux from the stator to flow through that part of the rotor core which is positioned between the first gap and the circumferential surface of the rotor core. Consequently, concentration of the demagnetizing magnetic field is prevented from occurring in the rotor core. As a result, the maximum strength of the demagnetizing magnetic field in the permanent magnet is reduced.

Furthermore, with the reduction in the maximum strength of the demagnetizing magnetic field in the permanent magnet, the thickness of the permanent magnet in the magnetization direction can be reduced. As a result, the volume and thus the weight of the permanent magnet can be accordingly reduced, thereby reducing the cost of the rotor.

According to further implementations, when viewed along the axial direction of the rotor core, for each of the permanent magnets, the first side surface of the permanent magnet is oblique to a radial direction of the rotor core.

Further, the first side surface of the permanent magnet is perpendicular to the magnetization direction of the permanent magnet, and the magnetization direction of the permanent magnet is oblique to the radial direction of the rotor core.

The slots of the rotor core are arranged in pairs. For each pair of the slots, the two permanent magnets which are respectively received in the two slots of the pair are arranged so as to together form one magnetic pole of the rotor.

Each of the permanent magnets has a substantially rectangular cross section perpendicular to the axial direction of the rotor core. Each pair of the slots of the rotor core is so formed that the two permanent magnets which are respectively received in the two slots of the pair together form a substantially V-shape that opens toward the circumferential surface of the rotor core.

When viewed along the axial direction of the rotor core, for each of the permanent magnets, the boundary between the second gap and the abutment area is preferably positioned, in a direction perpendicular to the magnetization direction of the permanent magnet, closer to the first corner portion of the permanent magnet than the center of the first side surface of the permanent magnet is.

When viewed along the axial direction of the rotor core, for each of the permanent magnets, the first side surface of the permanent magnet is perpendicular to the magnetization direction of the permanent magnet. The inner surface of the corresponding slot of the rotor core has a first portion that faces the first side surface of the permanent magnet through the first gap formed therebetween, a second portion that faces the first side surface through the second gap formed therebetween, a third portion that abuts the first side surface at the abutment area, and a fourth portion that makes up a shoulder between the second and third portions. The shoulder extends obliquely with respect to the magnetization direction of the permanent magnet so that the boundary between the shoulder and the second portion of the inner surface of the corresponding slot is positioned, in a direction perpendicular to the magnetization direction of the permanent magnet, closer to the first corner portion of the permanent magnet than the boundary between the shoulder and the third portion of the inner surface of the corresponding slot is.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
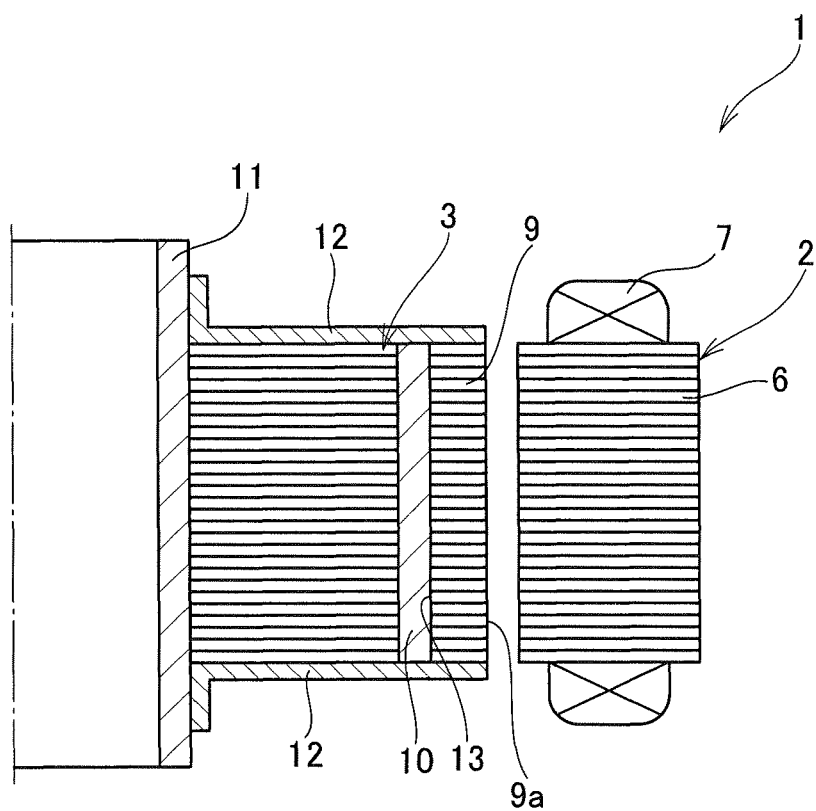
FIG. 1 is a schematic cross-sectional view illustrating the overall configuration of an electric rotating machine which includes a rotor according to a first embodiment.

Exemplary embodiments will be described hereinafter with reference to FIGS. 1-6. It should be noted that for the sake of clarity and understanding, identical components having identical functions in different embodiments have been marked, where possible, with the same reference numerals in each of the figures and that for the sake of avoiding redundancy, descriptions of the identical components will not be repeated.

First Embodiment

FIG. 1 shows the overall configuration of an electric rotating machine 1 which includes a rotor 3 according to a first embodiment.

In this embodiment, the electric rotating machine 1 is configured as a motor generator that can function both as an electric motor and as an electric generator in, for example, a hybrid or electric vehicle.

As shown in FIG. 1, the electric rotating machine 1 includes a hollow cylindrical stator 2 and the rotor 3 that is rotatably disposed radially inside of the stator 2. That is to say, in the present embodiment, the electric rotating machine 1 is of an inner rotor type. In addition, it should be noted that for the sake of simplicity, only half of the electric rotating machine 1 is shown in FIG. 1.

The stator 2 includes a stator core 6 and a three-phase stator coil 7. The stator core 6 is formed, by laminating a plurality of magnetic steel sheets, into a hollow cylindrical shape. The stator coil 7 is mounted on the stator core 6.

When the electric rotating machine 1 operates as an electric motor, the stator 2 creates, upon supply of three-phase alternating current to the stator coil 7, a rotating magnetic field which causes the rotor 3 to rotate. On the other hand, when the electric rotating machine 1 operates as an electric generator, the rotor 3 is driven by, for example, an internal combustion engine of the vehicle to rotate, thereby inducing three-phase alternating current in the stator coil 7.

The rotor 3 is disposed concentrically with and radially inside of the stator 2. The rotor 3 includes a rotor core 9, a plurality of permanent magnets 10 embedded in the rotor core 9, a rotating shaft 11, and a pair of end plates 12. That is to say, in the present embodiment, the rotor 3 is configured as an Interior Permanent Magnet (IPM) rotor.

The rotor core 9 is formed, by laminating a plurality of magnetic steel sheets, into a cylindrical shape. In addition, at the radial center of the rotor core 9, there is formed a through-hole, in which the rotating shaft 11 is fixedly fitted so as to rotate together with the rotor core 9.

The permanent magnets 10 are embedded in the rotor core 9 so as to form a plurality (e.g., eight in the present embodiment) of magnetic poles on the radially outer periphery of the rotor core 9. The magnetic poles are arranged in the circumferential direction of the rotor core 9 at predetermined intervals so that the polarities of the magnetic poles alternate between north and south in the circumferential direction.

More specifically, in the present embodiment, the rotor core 9 has a plurality of pairs of slots 13 formed in the vicinity of the radially outer periphery of the rotor core 9. Each of the slots 13 extends in the axial direction of the rotor core 9 so as to penetrate the rotor core 9 in the axial direction. In addition, it should be noted that though there is only one pair of the slots 13 shown in FIG. 2A, the plurality of pairs of the slots 13 are spaced in the circumferential direction of the rotor core 9 at predetermined intervals.

Each pair of the slots 13 is shaped so as to form a substantially V-shape that opens toward an outer circumferential surface (or a radially outer surface) 9a of the rotor core 9; the outer circumferential surface 9a faces the stator 2 which is disposed radially outside of the rotor 3. Further, for each pair of the slots 13, the two slots 13 (i.e., the left-side slot 13A and the right-side slot 13B in FIG. 2A) of the pair are symmetrically formed with respect to an imaginary line P that extends in a radial direction of the rotor core 9. Moreover, for each pair of the slots 13, the two slots 13A and 13B of the pair communicate with each other via a void space 15 that is formed in the rotor core 9 so as to extend between the two slots 13A and 13B in a direction perpendicular to the imaginary line P. That is, the two slots 13A and 13B and the void space 15 together define a continuous internal space of the rotor core 9.

Each of the permanent magnets 10 is inserted in a corresponding one of the slots 13 of the rotor core 9 so as to extend in the axial direction of the rotor core 9. Moreover, for each pair of the slots 13 of the rotor core 9, the two permanent magnets 10 (i.e., the left-side permanent magnet 10A and the right-side permanent magnet 10B in FIG. 2A) which are respectively inserted in the two slots 13A and 13B of the pair are arranged so that the polarities (north or south) of the two permanent magnets 10A and 10B are the same on the radially outer side (i.e., on the stator 2 side). Consequently, the two permanent magnets 10A and 10B together form one of the magnetic poles on the radially outer periphery of the rotor core 9.

Figure 2A:
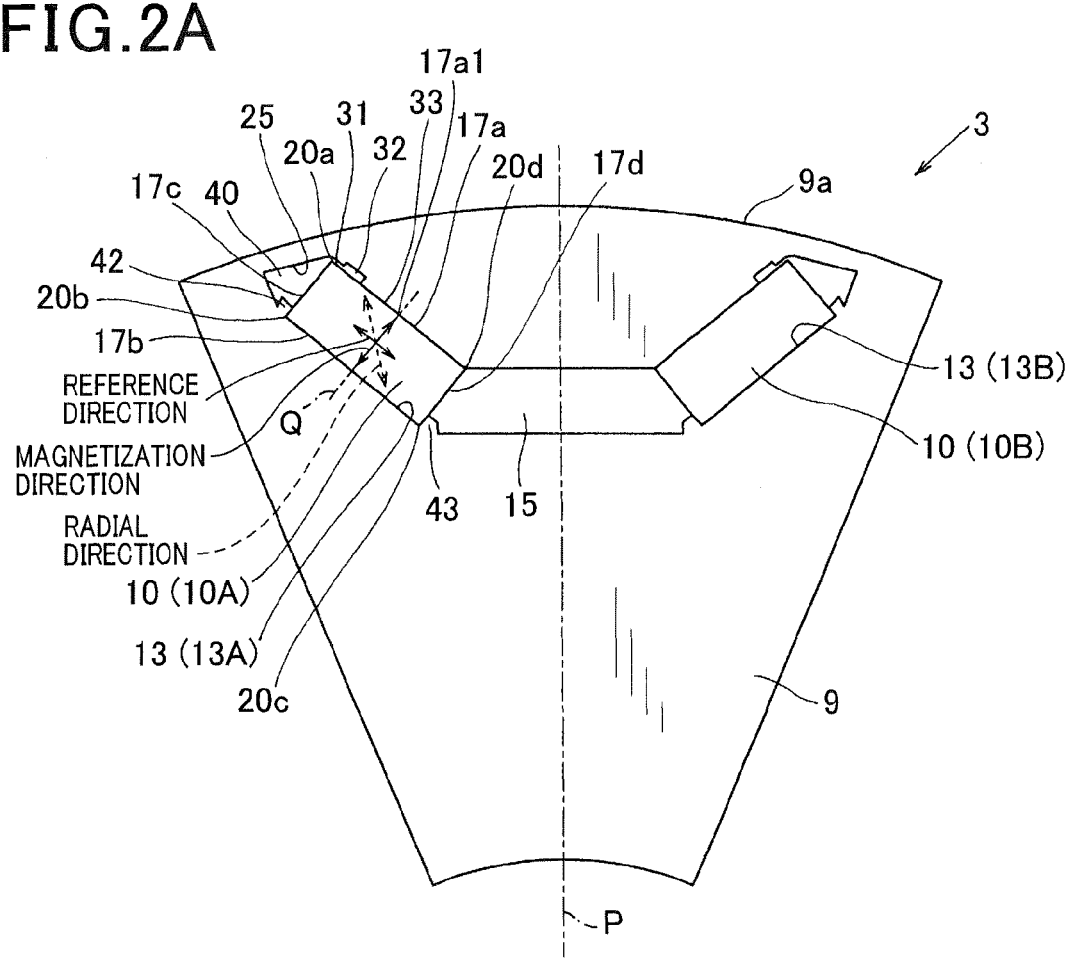
FIG. 2A is an axial end view of part of the rotor according to the first embodiment.

Furthermore, as shown in FIG. 2A, when viewed along the axial direction of the rotor core 9, the two permanent magnets 10A and 10B are symmetrically arranged and extend obliquely with respect to the imaginary line P. That is, the imaginary line P makes up a centerline P of the magnetic pole formed of the two permanent magnets 10A and 10B which bisects the magnetic pole in the circumferential direction of the rotor core 9. Consequently, the two permanent magnets 10A and 10B also together form a substantially V-shape that opens radially outward (i.e., toward the outer circumferential surface 9a of the rotor core 9).

Figure 2B:
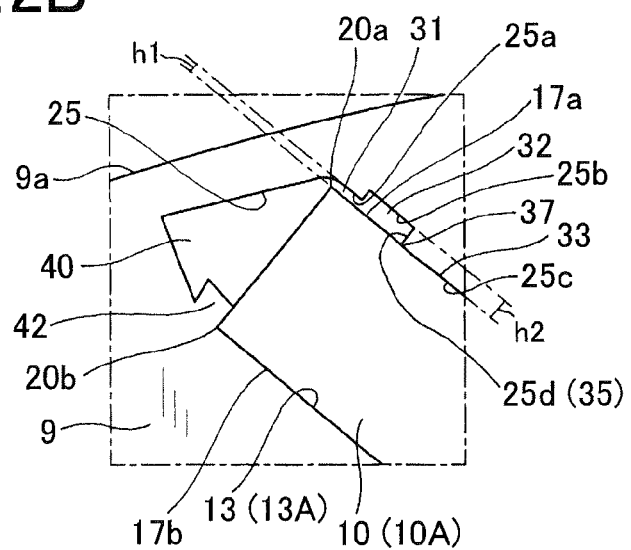
FIG. 2B is an enlarged view of part of FIG. 2A.

In the present embodiment, each of the permanent magnets 10A and 10B has a substantially rectangular cross section perpendicular to the axial direction of the rotor core 9 (i.e., perpendicular to the paper surface of FIGS. 2A and 2B). More specifically, the cross section is longer in a reference direction of the permanent magnet than in the magnetization direction of the permanent magnet; the reference direction is perpendicular to both the magnetization direction and the axial direction of the rotor core 9. In addition, each of the permanent magnets 10A and 10B is arranged with the magnetization direction thereof being oblique to a radial direction of the rotor core 9 which is indicted with a dashed line in FIG. 2A.

Referring back to FIG. 1, the end plates 12 are respectively provided on opposite axial end faces of the rotor core 9 so as to together sandwich the rotor core 9 in the axial direction. In addition, each of the end plates 12 has, at the radial center thereof, a through-hole through which the rotating shaft 11 extends.

Next, the outstanding features of the rotor 3 according to the present embodiment will be explained with reference to FIGS. 2A and 2B.

It should be noted that for the sake of avoiding redundancy, the following explanation of the outstanding features of the rotor 3 will be made only by taking a corresponding pair of one permanent magnet 10A and one slot 13A of the rotor core 9 as an example.

As shown in FIGS. 2A and 2B, the permanent magnet 10A has a first opposite pair of side surfaces 17a and 17b that are opposite to and separated from each other in the magnetization direction of the permanent magnet 10A, and a second opposite pair of side surfaces 17c and 17d that are opposite to and separated from each other in the reference direction of the permanent magnet 10A. That is, when viewed along the axial direction of the rotor core 9, both the side surfaces 17a and 17b are perpendicular to the magnetization direction, and both the side surfaces 17c and 17d are perpendicular to the reference direction of the permanent magnet 10A. Moreover, the side surface 17a is positioned closer to the outer circumferential surface 9a of the rotor core 9 than the side surface 17b is in the magnetization direction, and the side surface 17d is positioned closer to the void space 15 than the side surface 17c is in the reference direction.

Accordingly, the permanent magnet 10A also has four corner portions, i.e., a corner portion 20a between the side surfaces 17a and 17c, a corner portion 20b between the side surfaces 17c and 17b, a corner portion 20c between the side surfaces 17b and 17d, and a corner portion 20d between the side surfaces 17d and 17a.

In addition, among the four corner portions of the permanent magnet 10A, the corner portion 20a is positioned closest to the outer circumferential surface 9a of the rotor core 9. The corner portion 20a will be referred to as the first corner portion 20a of the permanent magnet 10A hereinafter. Among the four side surfaces of the permanent magnet 10A, the side surface 17a is perpendicular to an imaginary line Q, faces radially outward (i.e., toward the stator 2 side), and makes up part of the first corner portion 20a of the permanent magnet 10A; the imaginary line Q extends in the magnetization direction of the permanent magnet 10A through the center of the cross section of the permanent magnet 10A. The side surface 17a will be referred to as the first side surface 17a of the permanent magnet 10A hereinafter.

In the present embodiment, the slot 13A of the rotor core 9 is shaped so that between the first side surface 17a of the permanent magnet 10A and the inner surface 25 of the slot 13A (i.e., the inner surface 25 of the rotor core 9 which defines the slot 13A), there are formed a first gap 31, a second gap 32 and an abutment area 33 from the first corner portion 20a side in this order.

The first gap 31 is formed between a radially outer end portion (i.e., an end portion on the first corner portion 20a side) of the first side surface 17a of the permanent magnet 10A and the inner surface 25 of the slot 13A in the magnetization direction of the permanent magnet 10A. In other words, the first gap 31 separates the radially outer end portion of the first side surface 17a of the permanent magnet 10A from the inner surface 25 of the slot 13A.

The second gap 32 is formed between a portion of the first side surface 17a of the permanent magnet 10A, which adjoins the radially outer end portion of the first side surface 17a, and the inner surface 25 of the slot 13A in the magnetization direction of the permanent magnet 10A. That is, the second gap 32 is positioned inside of the first gap 31 in the reference direction of the permanent magnet 10A. In addition, the first and second gaps 31 and 32 communicate with each other.

The inner surface 25 of the slot 13A has a first portion 25a and a second portion 25b which both extend parallel to the first side surface 17a of the permanent magnet 10A and respectively define the first and second gaps 31 and 32 together with the first side surface 17a of the permanent magnet 10A.

Further, in the present embodiment, the width h1 of the first gap 31 in the magnetization direction of the permanent magnet 10A is set to be less than the width h2 of the second gap 32 in the magnetization direction. In other words, the second portion 25b of the inner surface 25 of the slot 13A is separated further from the first side surface 17a of the permanent magnet 10A than the first portion 25a of the inner surface 25 is in the magnetization direction of the permanent magnet 10A.

The abutment area 33, where the first side surface 17a of the permanent magnet 10A and the inner surface 25 of the slot 13A abut each other, is positioned on the opposite side of the second gap 32 to the first gap 31.

The inner surface 25 of the slot 13A also has a third portion 25c that abuts the first side surface 17a of the permanent magnet 10A to together define the abutment area 33. That is, the third portion 25c protrudes from the first and second portions 25a and 25b of the inner surface 25 of the slot 13A to the first side surface 17a of the permanent magnet 10A in the magnetization direction of the permanent magnet 10A.

The inner surface 25 of the slot 13A further has a fourth portion 25d that extends in the magnetization direction of the permanent magnet 10A between the second and third portions 25b and 25c of the inner surface 25. The fourth portion 25d makes up a shoulder 35 between the second and third portions 25b and 25c of the inner surface 25.

Furthermore, in the present embodiment, the boundary 37 between the second gap 32 and the abutment area 33 is positioned closer to the first corner portion 20a of the permanent magnet 10A than the center 17a1 of the first side surface 17a of the permanent magnet 10A is in the reference direction of the permanent magnet 10A.

In the present embodiment, the slot 13A of the rotor core 9 is shaped to further form a void space 40 between the side surface 17c of the permanent magnet 10A and the inner surface 25 of the slot 13A. In addition, the void space 40 is formed so as to communicate with the first gap 31 in the vicinity of the first corner portion 20a of the permanent magnet 10A. However, it should be noted that the void space 40 may also be formed so as not to communicate with the first gap 31.

As described previously, the slot 13A communicates with the slot 13B via the void space 15 formed therebetween. The permanent magnet 10A is inserted in the slot 13A so that the side surface 17d of the permanent magnet 10A faces the void space 15.

In the present embodiment, the rotor core 9 further has both a first supporting portion 42 and a second supporting portion 43 that abut and thereby support the permanent magnet 10A in the reference direction of the permanent magnet 10A.

More specifically, the first supporting portion 42 includes that part of the inner surface 25 of the slot 13A which abuts, in the reference direction of the permanent magnet 10A, an end portion of the side surface 17c of the permanent magnet 10A on the corner portion 20b side. Consequently, the first supporting portion 42 abuts and thereby supports the corner portion 20b of the permanent magnet 10A in the reference direction.

On the other hand, the second supporting portion 43 includes that part of the inner surface 25 of the slot 13A which abuts, in the reference direction of the permanent magnet 10A, an end portion of the side surface 17d of the permanent magnet 10A on the corner portion 20c side. Consequently, the second supporting portion 43 abuts and thereby supports the corner portion 20c of the permanent magnet 10A in the reference direction.

Consequently, the permanent magnet 10A is fixed between the first and second supporting portions 42 and 43 of the rotor core 9 in the reference direction of the permanent magnet 10A.

Moreover, as described previously, the majority of the side surface 17a of the permanent magnet 10A abuts the inner surface 25 of the slot 13A at the abutment area 33. On the other hand, the entire side surface 17b of the permanent magnet 10A abuts the inner surface 25 of the slot 13A. Consequently, the permanent magnet 10A is also fixed in the magnetization direction thereof in the slot 13A.

In addition, it should be noted that the first and second gaps 31 and 32 and the void spaces 15 and 40 may also be filled with a material having a lower magnetic permeability than the rotor core 9, such as a resin.

The above-described rotor 3 according to the present embodiment has the following advantages.

In the present embodiment, the rotor 3 includes the hollow cylindrical rotor core 9 that has the slots 13 (i.e., 13A and 13B) formed therein and the permanent magnets 10 (i.e., 10A and 10B) each of which is received in the corresponding one of the slots 13 of the rotor core 9. The rotor 3 is rotatably disposed in the electric rotating machine 1 with the outer circumferential surface 9a of the rotor core 9 radially facing the stator 2. When viewed along the axial direction of the rotor core 9, each of the permanent magnets 10 has the corner portions 20a-20d among which the first corner portion 20a is positioned closest to the outer circumferential surface 9a of the rotor core 9. Each of the permanent magnets 10 also has the side surfaces 17a-17d including the first side surface 17a that intersects the imaginary line Q at a right angle, faces radially outward (i.e., toward the stator 2 side), and makes up part of the first corner portion 20a of the permanent magnet 10. The imaginary line Q extends in the magnetization direction of the permanent magnet 10 through the center of the permanent magnet 10. For each of the permanent magnets 10, there are formed, between the first side surface 17a of the permanent magnet 10 and the inner surface 25 of the corresponding slot 13 of the rotor core 9, the first gap 31, the second gap 32 and the abutment area 33 from the first corner portion 20a side in this order. The first and second gaps 31 both separate the first side surface 17a of the permanent magnet 10 from the inner surface 25 of the corresponding slot 13 of the rotor core 9 and communicate with each other. At the abutment area 33, the first side surface 17a of the permanent magnet 10 and the inner surface 25 of the corresponding slot 13 of the rotor core 9 abut each other. The width h1 of the first gap 31 in the magnetization direction of the permanent magnet 10 is set to be less than the width h2 of the second gap 32 in the magnetization direction.

Figure 3:
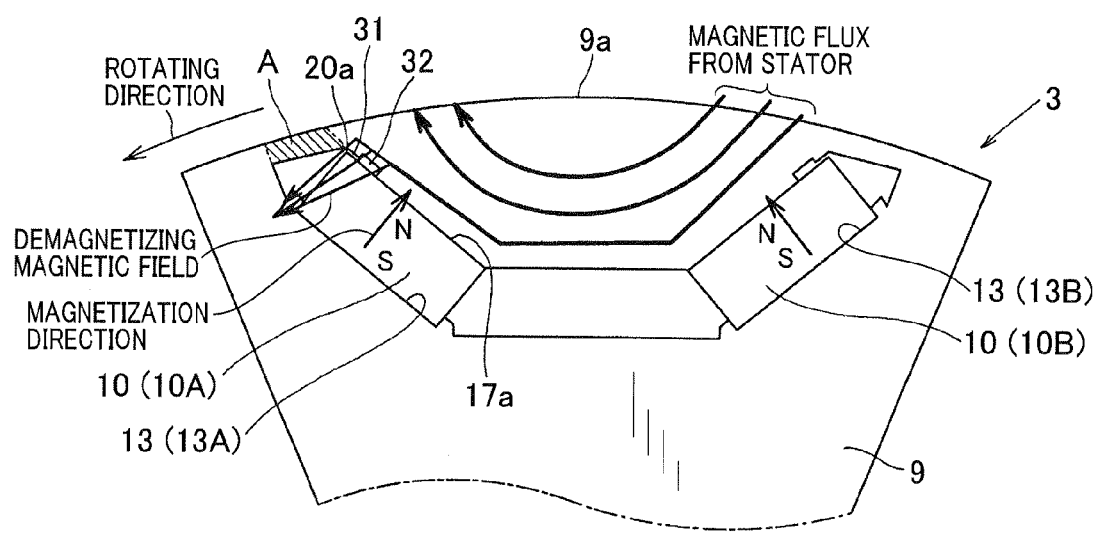
FIG. 3 is a schematic view illustrating the flow of magnetic flux in the rotor according to the first embodiment.
Figure 7A:
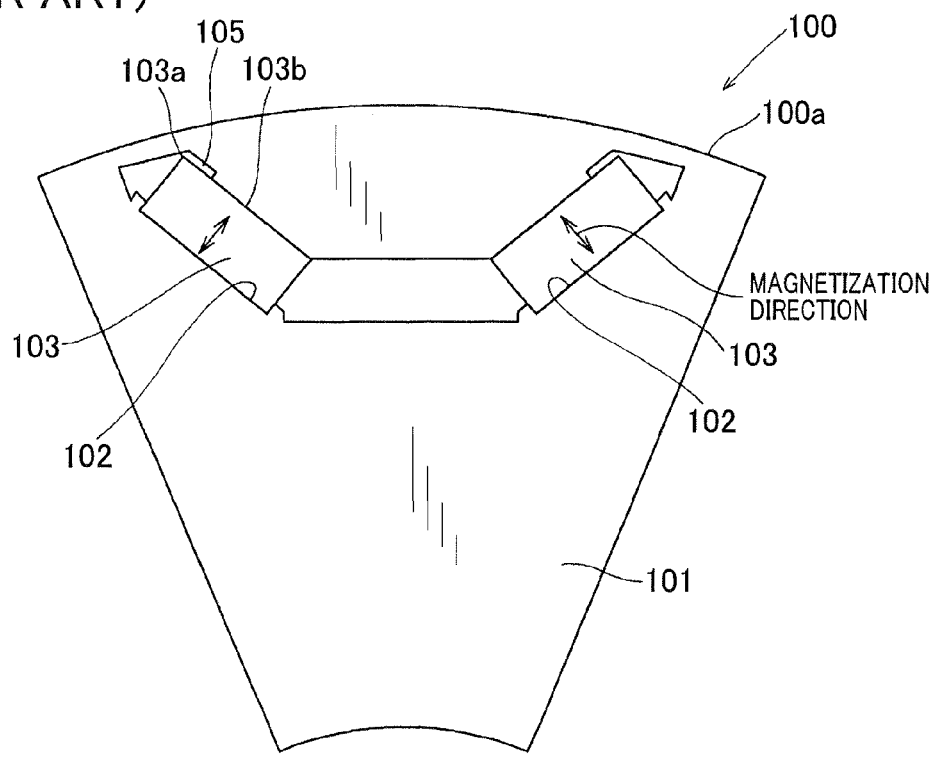
FIG. 7A is an axial end view of part of a rotor according to the prior art.
Figure 7B:
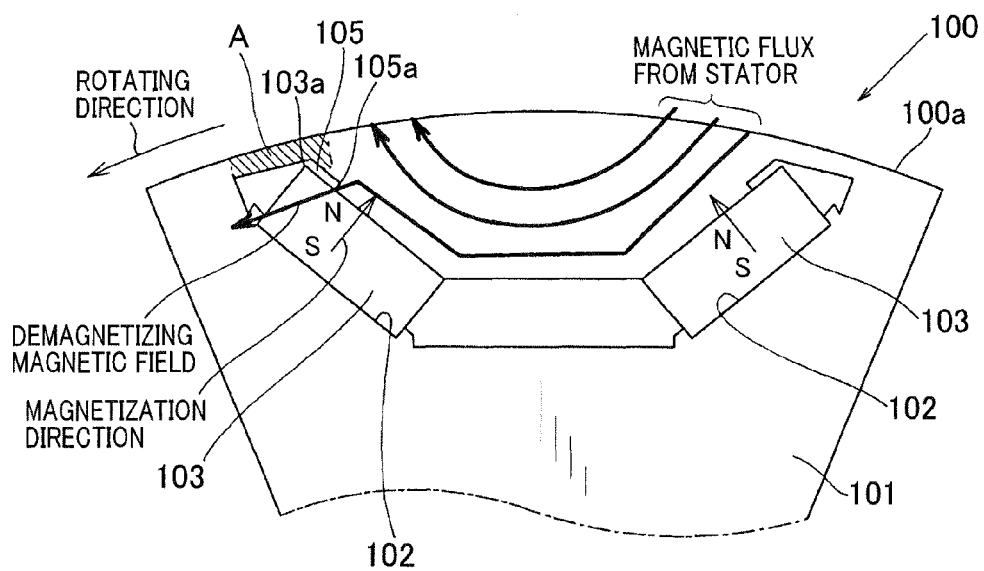
FIG. 7B is a schematic view illustrating the flow of magnetic flux in the rotor according to the prior art.

With the above configuration, by setting the width h1 of the first gap 31 to be less than the width h2 of the second gap 32, the volume of that part of the rotor core 9 which is positioned between the first gap 31 and the outer circumferential surface 9a of the rotor core 9 is increased. Consequently, as shown in FIG. 3, magnetic saturation is prevented from occurring at that part of the rotor core 9. As a result, the magnetically-saturated area A of the rotor core 9 in the vicinity of the first corner portion 20a is reduced in comparison with the prior art shown in FIG. 7B.

Further, with the reduced magnetically-saturated area A of the rotor core 9, it becomes possible for magnetic flux from the stator 2 to flow through that part of the rotor core 9 which is positioned between the first gap 31 and the outer circumferential surface 9a of the rotor core 9. Consequently, concentration of the demagnetizing magnetic field is prevented from occurring in the rotor core 9. Here, as described previously, the demagnetizing magnetic field denotes a magnetic field which is applied by the stator 2 to the permanent magnet 10 in a direction opposite to the magnetization direction of the permanent magnet 10. As a result, the maximum strength of the demagnetizing magnetic field in the permanent magnet 10 is reduced.

Furthermore, with the reduction in the maximum strength of the demagnetizing magnetic field in the permanent magnet 10, the thickness of the permanent magnet 10 in the magnetization direction thereof can be reduced. As a result, the volume and thus the weight of the permanent magnet 10 can be accordingly reduced, thereby reducing the cost of the rotor 3.

Moreover, in the present embodiment, when viewed along the axial direction of the rotor core 9, for each of the permanent magnets 10, the boundary 37 between the second gap 32 and the abutment area 33 is positioned closer to the first corner portion 20a of the permanent magnet 10 than the center 17a1 of the first side surface 17a of the permanent magnet 10 is in the reference direction of the permanent magnet 10.

With the above configuration, it is possible to prevent concentration of the demagnetizing magnetic field from occurring in the permanent magnet 10 while suppressing increase in the magnetic reluctance of the rotor core 9 to magnetic flux created by the permanent magnet 10.

More specifically, in terms of preventing concentration of the demagnetizing magnetic field from occurring in the permanent magnet 10, it is preferable to set the lengths of the first and second gaps 31 and 32 in the reference direction of the permanent magnet 10 as large as possible. On the other hand, with increase in the lengths of the first and second gaps 31 and 32 in the reference direction, the magnetic reluctance of the rotor core 9 to the magnetic flux created by the permanent magnet 10 is accordingly increased. In addition, with increase in the magnetic reluctance of the rotor core 9 to the magnetic flux created by the permanent magnet 10, the torque or the output electric power of the electric rotating machine 1 is decreased.

However, in the present embodiment, by positioning the boundary 37 between the second gap 32 and the abutment area 33 as above, the sum of the lengths of the first and second gaps 31 and 32 in the reference direction is limited below half the length of the first side surface 17a of the permanent magnet 10 in the reference direction. Consequently, it is possible to prevent the magnetic reluctance of the rotor core 9 to the magnetic flux created by the permanent magnet 10 from becoming too large. In other words, it is possible to suppress increase in the magnetic reluctance of the rotor core 9 to the magnetic flux created by the permanent magnet 10. At the same time, by configuring the first and second gaps 31 and 32 as described above, it is also possible to prevent concentration of the demagnetizing magnetic field from occurring in the permanent magnet 10.

Second Embodiment

This embodiment illustrates a rotor 3 which has almost the same configuration as the rotor 3 according to the first embodiment; accordingly, only the differences therebetween will be described hereinafter.

In the first embodiment, when viewed along the axial direction of the rotor core 9, for each of the permanent magnets 10, the shoulder 35 between the second and third portions 25b and 25c of the inner surface 25 of the corresponding slot 13 extends in the magnetization direction of the permanent magnet 10, in other words, extends perpendicular to the reference direction of the permanent magnet 10 (see, FIGS. 2A-2B).

Figure 4A:
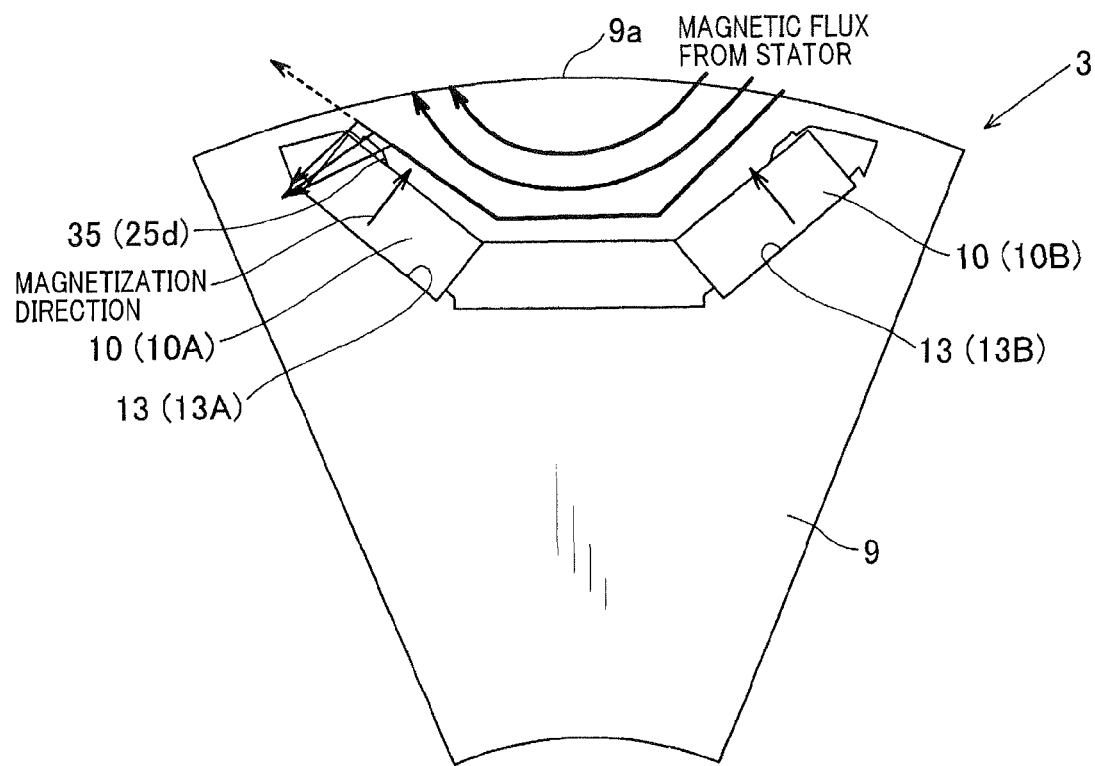
FIG. 4A is an axial end view of part of a rotor according to a second embodiment.
Figure 4B:
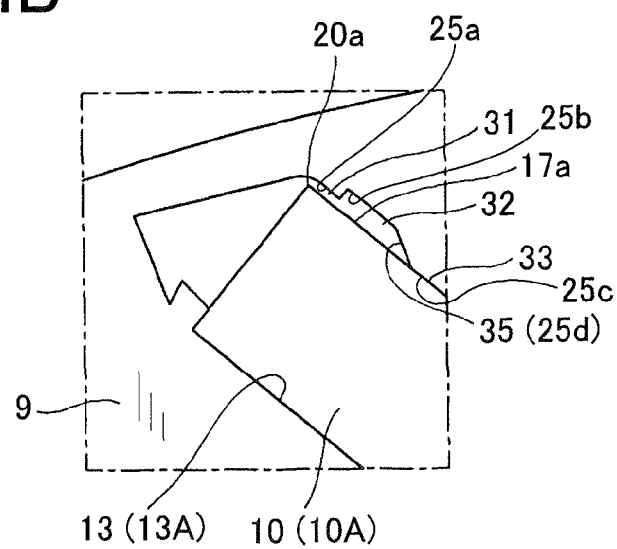
FIG. 4B is an enlarged view of part of FIG. 4A.

In comparison, in the present embodiment, as shown in FIGS. 4A-4B, when viewed along the axial direction of the rotor core 9, for each of the permanent magnets 10, the shoulder 35 between the second and third portions 25b and 25c of the inner surface 25 of the corresponding slot 13 extends obliquely with respect to the magnetization direction of the permanent magnet 10 with a predetermined angle formed therebetween, so that the boundary between the shoulder 35 and the second portion 25b is positioned closer to the first corner portion 20a of the permanent magnet 10 than the boundary between the shoulder 35 and the third portion 25c is in the reference direction of the permanent magnet 10.

The rotor 3 according to the present embodiment has the same advantages as the rotor 3 according to the first embodiment.

In addition, in the present embodiment, it is possible to smooth the flow of the magnetic flux from the stator 2 in the vicinity of the first and second gaps 31 and 32.

More specifically, in the vicinity of the first corner portion 20a of the permanent magnet 10, part of the magnetic flux from the stator 2 flows into the permanent magnet 10, thereby applying the demagnetizing magnetic field to the permanent magnet 10. The remainder of the magnetic flux from the stator 2 flows, as indicated with a dashed-line arrow in FIG. 4A, to the outer circumferential surface 9a of the rotor core 9, thereby contributing to generation of the torque or the output electric power of the electric rotating machine 1.

In the present embodiment, by configuring the shoulder 35 as described above, it is possible to smooth the flow of that part of the magnetic flux from the stator 2 which flows to the outer circumferential surface 9a of the rotor core 9, thereby more effectively utilizing that part of the magnetic flux for generation of the torque or the output electric power of the electric rotating machine 1.

Third Embodiment

This embodiment illustrates a rotor 3 which has almost the same configuration as the rotor 3 according to the first embodiment; accordingly, only the differences therebetween will be described hereinafter.

In the first embodiment, the slots 13 of the rotor core 9 are arranged in pairs. Further, each pair of the slots 13 is shaped so as to form the substantially V-shape that opens toward the outer circumferential surface 9a of the rotor core 9. Moreover, for each pair of the slots 13, the two permanent magnets 10 which are respectively received in the two slots 13 of the pair are arranged so as to form one magnetic pole of the rotor 3 (see, FIG. 2A).

Figure 5A:
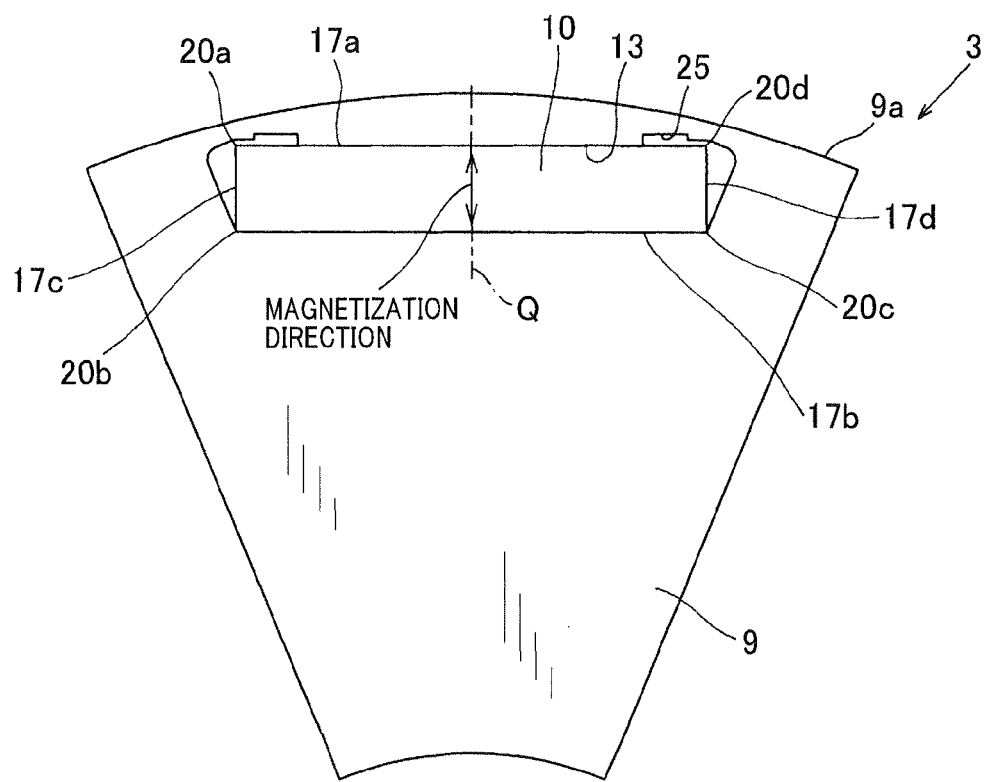
FIG. 5A is an axial end view of part of a rotor according to a third embodiment.
Figure 5B:
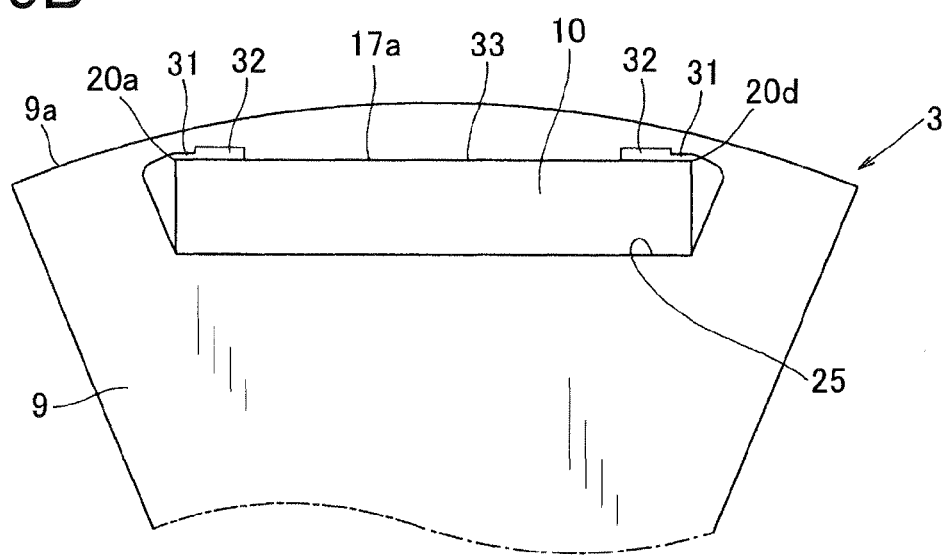
FIG. 5B is an enlarged view of part of FIG. 5A.

In comparison, in the present embodiment, as shown in FIGS. 5A-5B, each of the slots 13 of the rotor core 9 is shaped so as to extend perpendicular to a radial direction of the rotor core 9. Moreover, for each of the slots 13, the permanent magnet 10 received in the slot 13 forms one magnetic pole of the rotor 3. In other words, in the present embodiment, each of the magnetic poles of the rotor 3 is formed of a single permanent magnet 10.

Moreover, each of the permanent magnets 10 is arranged with the magnetization direction thereof being parallel to the radial direction of the rotor core 9. Consequently, for each of the permanent magnets 10, the imaginary line Q, which extends in the magnetization direction of the permanent magnet 10 through the center of the permanent magnet 10, is also parallel to the radial direction of the rotor core 9. Therefore, the first side surface 17a of the permanent magnet 10, which is perpendicular to the imaginary line Q, is also perpendicular to the radial direction of the rotor core 9.

Furthermore, in the present embodiment, for each of the permanent magnets 10, both the corner portions 20a and 20d are positioned closest to the outer circumferential surface 9a of the rotor core 9 in the four corner portions 20a-20d of the permanent magnet 10. That is, in the present embodiment, both the corner portions 20a and 20d are first corner portions of the permanent magnet 10.

Accordingly, in the present embodiment, for each of the permanent magnets 10, the first side surface 17a of the permanent magnet 10 intersects the imaginary line Q at a right angle, faces radially outward (i.e., toward the stator 2 side), and makes up part of each of the first corner portions 20a and 20d of the permanent magnet 10.

Furthermore, in the present embodiment, since each of the permanent magnets 10 has the two first corner portions 20a and 20d, at each of two opposite ends of the first side surface 17a of the permanent magnet 10 in the reference direction of the permanent magnet 10, there are formed both a first gap 31 and a second gap 32 between the first side surface 17a and the inner surface 25 of the corresponding slot 13 of the rotor core 9. Further, between the two second gaps 32, there is also formed a common abutment area 33 where the first side surface 17a of the permanent magnet 10 and the inner surface 25 of the corresponding slot 13 abut each other.

The rotor 3 according to the present embodiment has the same advantages as the rotor 3 according to the first embodiment.

While the above particular embodiments have been shown and described, it will be understood by those skilled in the art that various modifications, changes, and improvements may be made without departing from the spirit of the invention.

For example, in the previous embodiments, the invention is directed to the inner rotor-type electric rotating machine 1, in which the rotor 3 is rotatably disposed radially inside of the stator 2. However, the invention can also be applied to outer rotor-type electric rotating machines which include a stator and a rotor that is rotatably disposed radially outside of the stator.

In the previous embodiments, the corner portions 20a-20d of the permanent magnets 10 are formed at right angles. However, the corner portions 20a-20d of the permanent magnets 10 may also be chamfered.

In the previous embodiments, each of the permanent magnets 10 has the substantially rectangular cross section perpendicular to the axial direction of the rotor core 9. However, the permanent magnets 10 may also have cross sections of other shapes perpendicular to the axial direction of the rotor core 9.

For example, each of the permanent magnets 10 may have a trapezoidal cross section perpendicular to the axial direction of the rotor core 9 so that the lengths of the side surfaces 17c and 17d of the permanent magnet 10 in the magnetization direction are different from each other.

Moreover, for each of the permanent magnets 10, the side surfaces 17a-17d of the permanent magnet 10 may be formed as curved surfaces which have their respective centers of curvature positioned either inside or outside the permanent magnet 10. Alternatively, the side surfaces 17a-17d of the permanent magnet 10 may be formed as bent surfaces which are bent at predetermined angles.

In the previous embodiments, when viewed along the axial direction of the rotor core 9, for each of the permanent magnets 10, the first side surface 17a of the permanent magnet 10 is perpendicular to the magnetization direction of the permanent magnet 10 and thus intersects the imaginary line Q at a right angle. However, the first side surface 17a may be oblique to the magnetization direction of the permanent magnet 10 and thus intersect the imaginary line Q at a given angle not equal to 90°.

In the first and second embodiments, each pair of the slots 13 of the rotor core 9 is so formed that the two permanent magnets 10 which are respectively received in the two slots 13 of the pair together form the substantially V-shape that opens radially outward. However, each pair of the slots 13 of the rotor core 9 may also be so formed that the two permanent magnets 10 which are respectively received in the two slots 13 of the pair together form a substantially V-shape that opens radially inward.

Figure 6:
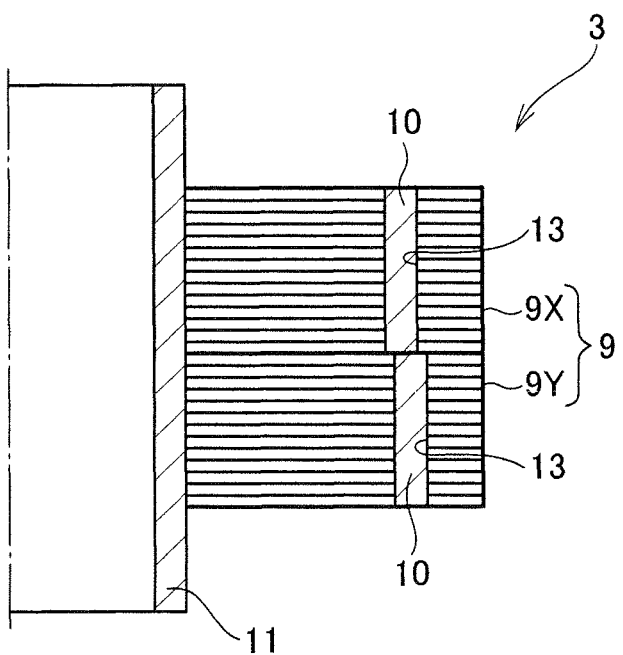
FIG. 6 is a cross-sectional view of a rotor according to a modification to the first to the third embodiments.

Moreover, as shown in FIG. 6, the rotor core 9 may be comprised of, for example, two blocks 9X and 9Y each of which has a plurality of slots 13 formed therein. Further, each of the slots 13 of the blocks 9X and 9Y may have a permanent magnet 10 received therein. Furthermore, the positions of the slots 13 of the block 9X may be circumferentially offset from those of the slots 13 of the block 9Y, thereby skewing the magnetic poles of the rotor 3 which are formed of the permanent magnets 10 received in the slots 13 of the blocks 9X and 9Y

What is claimed is:

1. A rotor for an electric rotating machine, the rotor comprising:
    a rotor core having a plurality of slots formed therein, the rotor core also having a circumferential surface that extends in a circumferential direction of the rotor core; and
    a plurality of permanent magnets each of which is received in a corresponding one of the slots of the rotor core, wherein the rotor is configured to be rotatably disposed in the electric rotating machine with the circumferential surface of the rotor core facing a stator of the electric rotating machine, when viewed along an axial direction of the rotor core, each of the permanent magnets has a plurality of corner portions among which a first corner portion is positioned closest to the circumferential surface of the rotor core, each of the permanent magnets also has a plurality of side surfaces including a first side surface that intersects an imaginary line, faces toward the stator side and makes up part of the first corner portion of the permanent magnet, the imaginary line extending in a magnetization direction of the permanent magnet through a center of the permanent magnet, for each of the permanent magnets, there are formed, between the first side surface of the permanent magnet and an inner surface of the corresponding slot of the rotor core, a first gap, a second gap and an abutment area from the first corner portion side in this order, the first and second gaps both separate the first side surface of the permanent magnet from the inner surface of the corresponding slot of the rotor core and communicate with each other, at the abutment area, the first side surface of the permanent magnet and the inner surface of the corresponding slot of the rotor core abut each other, portions of the inner surface of the slots, which define the first gap, the second gap and the abutment area, are all parallel to the first side surface of the permanent magnet; and the first gap has a smaller width than the second gap in a direction perpendicular to the first side surface of the permanent magnet.

2. The rotor as set forth in claim 1, wherein when viewed along the axial direction of the rotor core, for each of the permanent magnets, the first side surface of the permanent magnet is oblique to a radial direction of the rotor core.

3. The rotor as set forth in claim 2, wherein when viewed along the axial direction of the rotor core, for each of the permanent magnets, the first side surface of the permanent magnet is perpendicular to the magnetization direction of the permanent magnet, and the magnetization direction of the permanent magnet is oblique to the radial direction of the rotor core.

4. The rotor as set forth in claim 3, wherein the plurality of slots of the rotor core are arranged in pairs, and for each pair of the slots, the two permanent magnets which are respectively received in the two slots of the pair are arranged so as to together form one magnetic pole of the rotor.

5. The rotor as set forth in claim 4, wherein each of the permanent magnets has a substantially rectangular cross section perpendicular to the axial direction of the rotor core, and each pair of the slots of the rotor core is so formed that the two permanent magnets which are respectively received in the two slots of the pair together form a substantially V-shape that opens toward the circumferential surface of the rotor core.

6. The rotor as set forth in claim 1, wherein when viewed along the axial direction of the rotor core, for each of the permanent magnets, a boundary between the second gap and the abutment area is positioned, in a direction perpendicular to the magnetization direction of the permanent magnet, closer to the first corner portion of the permanent magnet than a center of the first side surface of the permanent magnet is.

7. The rotor as set forth in claim 1, wherein when viewed along the axial direction of the rotor core, for each of the permanent magnets, the first side surface of the permanent magnet is perpendicular to the magnetization direction of the permanent magnet, the portions of the inner surface of the slots of the rotor core includes a first portion that faces the first side surface of the permanent magnet through the first gap which is formed therebetween, a second portion that faces the first side surface through the second gap which is formed therebetween, a third portion that abuts the first side surface at the abutment area, and a fourth portion that makes up a shoulder between the second and third portions, and the shoulder extends obliquely with respect to the magnetization direction of the permanent magnet so that a boundary between the shoulder and the second portion of the inner surface of the corresponding slot is positioned, in a direction perpendicular to the magnetization direction of the permanent magnet, closer to the first corner portion of the permanent magnet than a boundary between the shoulder and the third portion of the inner surface of the corresponding slot is.

\* \* \* \* \*